Patented Aug. 24, 1954

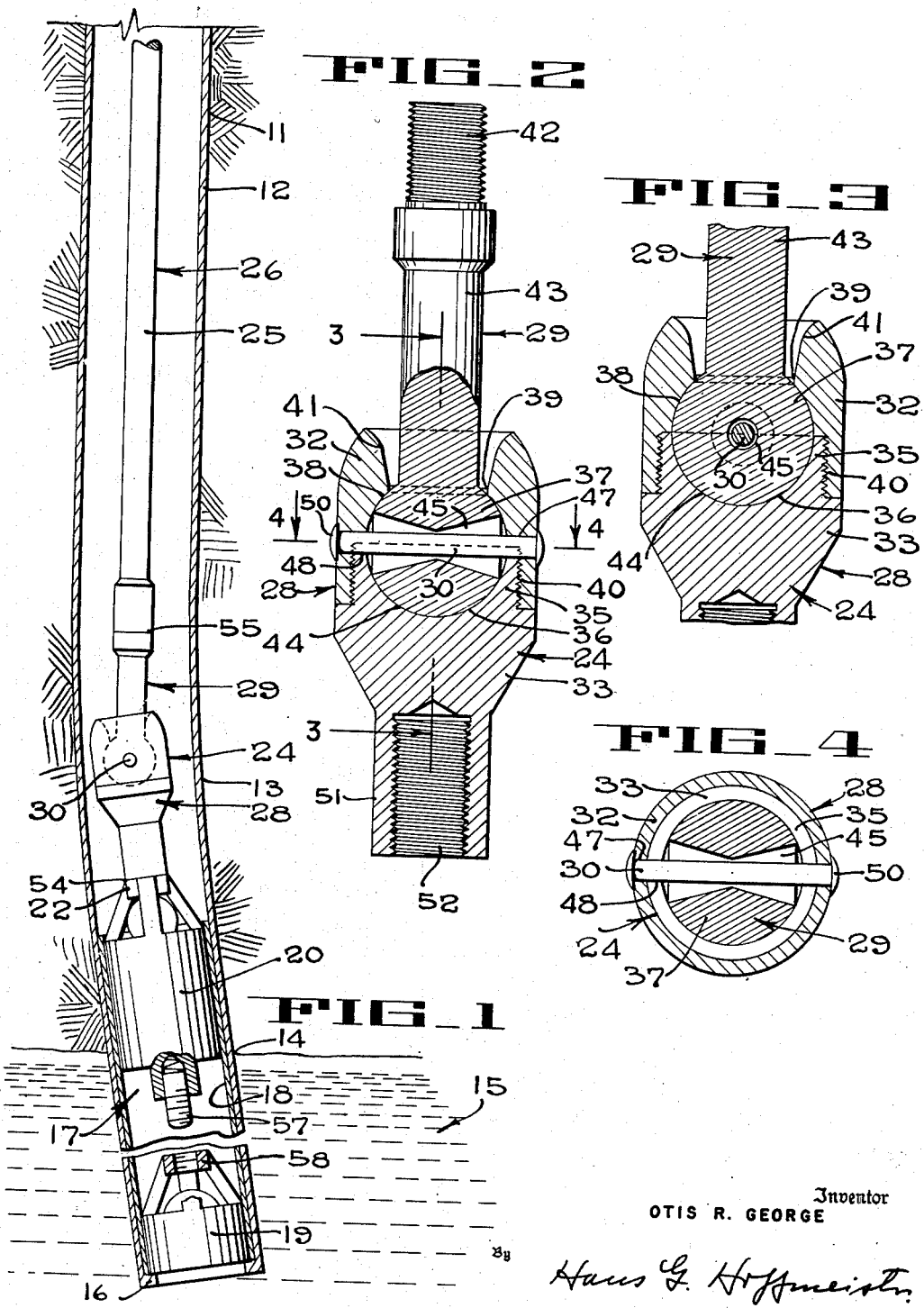

2,687,024

UNITED STATES PATENT OFFICE 2,687,024

BALL AND SOCKET JOINT CONSTRUCTION

Otis R. George, South Charleston, W. Va., assignor to Food Machinery and Chemical Corporation, San Jose, Calif., a corporation of Delaware Application November 21, 1950, Serial No. 196,828

2 Claims. (Cl. 64—7)

The present invention relates to a ball and socket joint construction.

One object of the present invention is to provide an improved, simple, durable and practicable ball and socket joint that is adapted to permit angular or tilting motion between connected parts.

Another object is to provide a ball and socket joint which permits universal motion between connected parts and is adapted to transmit longitudinal and rotative stresses between connected parts.

A further object is to provide a ball and socket joint which may be easily and quickly assembled but cannot become disassembled during the operation of the connected parts.

Another object is to provide a ball and socket joint having a socket constructed of two detachable members locked together to prevent separation thereof during operation.

Another object is to provide a ball and socket joint which may be easily assembled and disassembled and wherein the parts thereof are positively locked in assembled relation to permit transmission of torque therewith.

These and other objects and advantages of the present invention will become apparent from the following description and the accompanying drawings wherein:

Fig. 1 is a cross sectional view of the lower end portion of a well with a sucker rod pump disposed therein showing one use of the ball and socket joint of the present invention.

Fig. 2 is an enlarged longitudinal section of the ball and socket joint of the present invention.

Fig. 3 is a longitudinal section of Fig. 2 taken along line 3—3 thereof.

Fig. 4 is a transverse section taken along line 4—4 of Fig. 2.

The ball and socket joint of the present invention has numerous practical uses and applications one of which is exemplified in Fig. 1 of the drawing, wherein, the numeral 11 designates a well hole which diverts from vertical and is lined with a metal casing 12 the bend of the well hole 11 and casing 12 being clearly shown at 13. The casing 12 extends downwardly beyond the end 14 of the drilled well hole 11 into a subsurface source of fluid 15 which it is desired to raise to the surface of the ground.

Disposed within the casing 12, adjacent its lower end 16 which is immersed in the sub-surface source of fluid 15, is a reciprocating sucker-rod pump 17 comprising a barrel 18, a ball foot valve 19 tightly fitted into the barrel 18, and a traveling valve or piston 20. The traveling valve 20 is provided with a connecting rod 22 which is threadably secured to the ball and socket joint 24 of the present invention, shown in detail in Figs. 2, 3 and 4. Said ball and socket joint 24 is in turn threadably secured to a bottom sucker-rod 25 of a chain of sucker-rods 26 which extends upwardly within the casing 12 and is attached above the ground surface to a vertical reciprocating actuating mechanism (not shown).

The ball and socket joint 24 provides a flexible connection between the bottom sucker-rod 25 and the traveling valve 20 which allows said traveling valve 20 to align itself within the barrel 18. Should the drilled well hole 11 diverge from vertical to a considerable degree a plurality of ball and socket joints, like the one shown at 24 in Fig. 1, may be connected where necessary between the individual sucker-rods in the chain of sucker-rods 26 to allow said sucker-rod chain 26 to substantially conform to and follow the curve of the hole 11 and casing 12. With the ball and socket joints 24 interposed between the individual sucker-rods and between the bottom sucker-rod 25 and the traveling valve 20, there will be no substantial bending stresses set up in the individual sucker-rods and the traveling valve 20 when the pump is operated i. e. when the chain of sucker-rods 26 and traveling valve 20 are reciprocated. Therefore, the traveling valve 20 will move in the barrel 18 with a minimum of friction, shock and vibration due to the tilting and aligning action of the ball and socket joint or joints 24.

The ball and socket joint 24 of the present invention (Figs. 2, 3 and 4) comprises a socket member 28, a mating ball member 29, and a locking pin or torque transfer member 30. The socket member 28 comprises two parts, an annular retaining portion 32 and a seat portion 33. One end of the seat portion 33 is formed with a reduced externally threaded portion 35 which is provided with a hemi-spherical concavity 36 adapted to seat a ball 37 formed on one end of the ball member 29. The annular retaining portion 32 comprises an inner annular arcuate surface 38 conforming to the curvature of the surface of the ball 37, a reduced mouth 39 and an interiorly enlarged threaded portion 40. Beyond the mouth 39 the inner surface of the retaining portion 32 is enlarged forming a flaring lip 41.

The mouth 39 is large enough so that in assembling the joint 24 the retaining portion 32 may be slipped over a threaded end 42 and down past a connecting stud 43 of the ball member 29, preparatory to the mating of the two socket portions 32 and 33 by the engagement of the threaded portion 40 with the threaded portion 35. Such engagement forms a socket 44 which encloses and retains the ball 37 while permitting universal movement thereof.

The ball 37 is provided with an oppositely tapered transverse passage 45 which is shaped somewhat like an hour-glass or double inverted cone, with the apex of the cones at the center. The retaining portion or sleeve 32 is equipped with two diametrically opposed holes 47 and the seat portion 33 is provided with two diametrically opposed semi-circular notches or grooves 48, said holes 47 and notches 48 registering with each other upon the full threaded engagement of the retaining sleeve 32 and seat portion 33. The holes 47 and 48 are so placed in the retaining sleeve 32 and the seat portion 33, respectively, that when the joint 24 is assembled the oppositely tapered transverse passage 45 in the ball 37 will, upon positioning thereof, register with said holes 47 and notches 48. Upon such registry the pin 30 is inserted into the passage 45 and journaled in the holes 47 and the grooves 48 to lock the retaining portion 32 and the seat portion 33 against relative rotation and consequent disengagement. The pin 30 is held in place by peening its ends as shown at 50. In addition to performing the above mentioned locking function the pin 30 in conjunction with the transverse passage 45 of the ball 37 limits relative rotation of the socket member 28 and the ball member 29 about their own axes, thus enabling the ball and socket joint 24 to transmit a torque while at the same time permitting universal movement thereof.

The seat portion 33 is formed with a reduced end 51 which is provided with a threaded socket 52 for engagement with one of the members to be coupled by the joint 24. The threaded end 42 on the ball member 29 serves as the engaging means for the other member which is to be coupled by the joint 24. In Fig. 1 the ball and socket joint 24 is shown with the threaded socket 52 (Fig. 2) connected to the pump connecting rod 22 at 54, and with the threaded end 42 (Fig. 2) connected to the bottom sucker rod 25 at 55.

The traveling valve 20 (Fig. 1) has a spring urged screw bolt 57 depending from its bottom end, said bolt 57 being adapted to be threaded into an internally threaded portion 58 of the foot valve 19. When it is desired to remove the foot valve 19 from the barrel 18 the traveling valve 20 is lowered in the barrel 18 until the bolt 57 enters the threaded portion 58. The chain of sucker-rods 26 is then rotated by any convenient means (not shown) which rotation is transferred to the traveling valve 20 due to the pinned torque transmitting feature of the ball and socket joint 24, previously described herein. This rotation of the traveling valve 20 threads the screw bolt 57 into the threaded hole 58 thus attaching the traveling valve 20 to the foot valve 19. The string of sucker-rods 26 is then lifted from the well hole 11 bringing with it the foot valve 19. A new foot valve 19 may be placed in position in the barrel 18 by dropping it down into the casing 12 and then pushing it into place at the bottom of the barrel 18 with the traveling valve 20.

While I have described a preferred embodiment of the present invention it will be understood that various changes and modifications may be made in the details thereof without departing from the spirit and scope of the appended claims.

Having thus described the invention, what I claim as new and desire to protect by Letters Patent is:

1. In a universal joint, means to transmit reciprocating movement in an angular direction comprising a ball, a socket member enclosing said ball and adjustably bearing thereon so as to receive reciprocating movement transmitted to said ball and transmit said reciprocating movement in a straight or an angular direction, said socket being formed by a seat portion and a sleeve portion threadably screwed together, one of said portions having holes and the other of said portions having notches adapted to register with said holes when the seat portion and the sleeve portion are screwed together on said ball, means to transmit rotary movement through said universal joint comprising a double cone-shaped passage through said ball with the apex of said cones at the center of said ball, a pin extending through said passage of substantially smaller diameter than the smallest diameter of said double cone-shaped passage, and means to secure the ends of said pin to said socket member, said pin passing through the holes and notches in the seat portion and the sleeve portion of said socket to prevent unscrewing of the seat portion and the sleeve portion when said pin is in place therein, the spacing between said pin and said double cone-shaped passage in said ball permitting free movement of the ball in the socket member through an arc equal to the arc of said cones before the walls of said double cone-shaped passage contact said pin.

2. In a universal joint, a ball, a socket enclosing said ball and bearing adjustably thereon, said socket being formed by a seat portion and a sleeve portion threadedly screwed together, one of said portions having holes and the other of said portions having notches adapted to register with said holes when the seat portion and the sleeve portion are screwed together on said ball, means to impart reciprocating and rotary movement to said ball, said socket receiving and transmitting said reciprocating movement from said ball in a straight or angular direction, and means to receive and transmit rotary motion from said ball to said socket, comprising a passage through said ball which tapers outwardly from the center of said ball, a pin secured to the walls of said socket and extending through said passage, said pin being of smaller diameter than the smallest diameter of said passage and being spaced from the walls of said passage at all points when reciprocating movement is being transmitted through said joint, said pin passing through the holes and notches in the seat portion and the sleeve portion of said socket to prevent unscrewing of the seat portion and the sleeve portion of said socket when said pin is in place therein, said ball having a free rotational movement of several degrees from its reciprocating position before the walls of said passage contact said pin to transmit rotary movement from said ball to said socket.

References Cited in the file of this patent

UNITED STATES PATENTS

| Number | Name | Date |
| --- | --- | --- |
| 860,767 | Rockwell | July 23, 1907 |
| 1,225,524 | Swartz | May 8, 1917 |
| 2,521,289 | Gerst | Sept. 5, 1950 |